(12) United States Patent
Yao et al.

(10) Patent No.: US 12,009,665 B2
(45) Date of Patent: Jun. 11, 2024

(54) PHOTOVOLTAIC SYSTEM, OPTIMIZER, AND METHOD FOR ADJUSTING WORKING STATE OF OPTIMIZER

(71) Applicant: Huawei Digital Power Technologies Co., Ltd., Shenzhen (CN)

(72) Inventors: Xiaofeng Yao, Xi'an (CN); Yanzhong Zhang, Shanghai (CN); Guilei Gu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 104 days.

(21) Appl. No.: 17/825,108

(22) Filed: May 26, 2022

(65) Prior Publication Data
US 2022/0285948 A1    Sep. 8, 2022

Related U.S. Application Data

(63) Continuation of application No. PCT/CN2020/099081, filed on Jun. 30, 2020.

(30) Foreign Application Priority Data

Nov. 27, 2019  (CN) .......................... 201911184561.0

(51) Int. Cl.
*H02J 3/38* (2006.01)
*H02S 40/30* (2014.01)

(52) U.S. Cl.
CPC .............. *H02J 3/381* (2013.01); *H02S 40/30* (2014.12); *H02J 2300/24* (2020.01); *Y02E 10/56* (2013.01)

(58) Field of Classification Search
CPC .......... Y02E 10/56; Y02E 10/50; H02J 3/381; H02J 2300/26; H02J 2300/24; H02S 40/30; G05F 1/67
See application file for complete search history.

(56) References Cited

U.S. PATENT DOCUMENTS 8,013,474 B2    9/2011   Besser et al.
2018/0131321 A1   5/2018   Xu et al.
(Continued)

FOREIGN PATENT DOCUMENTS

| CN | 102291052 A | 12/2011 |
| CN | 102983788 A | 3/2013 |
| CN | 107154780 A | 9/2017 |

(Continued)

*Primary Examiner* — Ryan Johnson
(74) *Attorney, Agent, or Firm* — Maier & Maier, PLLC (57) ABSTRACT

A photovoltaic system, an optimizer, a controller, a computer program product, a computer-readable storage medium, a chip, and a method for adjusting a working state of an optimizer are provided. The photovoltaic system includes a photovoltaic panel and an optimizer. The optimizer includes a controller, a first output port, and a second output port. The controller is configured to detect an electrical signal parameter between the first output port and the second output port. The controller is configured to adjust a working state of the optimizer from a no-output state or a limited-output state to an unlimited-output state when the electrical signal parameter changes. In the photovoltaic system, the working state can be adjusted without using an unlocking apparatus, so that an implementation is simple, and costs are reduced.

3 Claims, 8 Drawing Sheets (56) References Cited

U.S. PATENT DOCUMENTS

2019/0326758 A1    10/2019  Zhu et al.
2020/0295572 A1*    9/2020  Yao ........................ H02J 3/381

FOREIGN PATENT DOCUMENTS

| CN | 109193777 A  | 1/2019  |
|----|--------------|---------|
| CN | 109428545 A  | 3/2019  |
| CN | 109787290 A  | 5/2019  |
| CN | 109831107 A  | 5/2019  |
| CN | 110391671 A  | 10/2019 |
| CN | 110957760 A  | 4/2020  |
| EP | 1798845 A1   | 6/2007  |
| JP | H02197224 A  | 8/1990  |
| JP | 2010518510 A | 5/2010  |
| JP | 2016086582 A | 5/2016  |
| JP | 2016519851 A | 7/2016  |
| JP | 2018124166 A | 8/2018  |
| WO | 2017087988 A1| 5/2017  |

\* cited by examiner

PHOTOVOLTAIC SYSTEM, OPTIMIZER, AND METHOD FOR ADJUSTING WORKING STATE OF OPTIMIZER

CROSS-REFERENCE TO RELATED APPLICATIONS

This application is a continuation of International Application No. PCT/CN2020/099081, filed on Jun. 30, 2020, claims priority to Chinese Patent Application No. 201911184561.0, filed on Nov. 27, 2019. The disclosures of the aforementioned applications are hereby incorporated by reference in their entireties.

TECHNICAL FIELD

The embodiments relate to the electricity field, a photovoltaic system, an optimizer, and a method for adjusting a working state of an optimizer.

BACKGROUND

In the photovoltaic inverter field, maximum power tracking and fast shutdown may be implemented at a component level through cooperation between an optimizer and an inverter. A typical photovoltaic power system generally includes photovoltaic panels, optimizers, and an inverter. An input of the optimizer is connected to an output of the photovoltaic panel. The optimizer may track a maximum power of the photovoltaic panel, perform fast shutdown in a special case, monitor a running state of a photovoltaic module, and the like. Outputs of a plurality of optimizers are connected in series and then connected to the inverter.

The inverter imposes a limitation on an input voltage. Therefore, if the input voltage exceeds a maximum input voltage allowed by the inverter, the inverter is damaged. In some scenarios, the inverter may communicate with the optimizer, and the inverter may read an operating state and a parameter of the optimizer, including an input/output voltage, an input/output current, a power, a temperature, and the like. The inverter may adjust the output voltage of the optimizer, to ensure that the input voltage of the inverter does not exceed the maximum input voltage. However, in some other scenarios, the optimizer cannot communicate with the inverter. In this case, the inverter cannot control the output voltage of the optimizer. To ensure that an output voltage obtained after all the optimizers are connected in series does not exceed the maximum input voltage allowed by the inverter, a default working state of the optimizer is a no-output state or a limited-output state. In this case, it may be ensured that the inverter is not damaged. However, an output of the optimizer is limited, thus an output power of the entire photovoltaic system is limited.

In a process of constructing the photovoltaic power system, an unlocking apparatus needs to be used. The photovoltaic panel, the optimizer, and the unlocking apparatus may constitute a photovoltaic system. The input of the optimizer is connected to the output of the photovoltaic panel, and the unlocking apparatus is connected to an output of the optimizer. The unlocking apparatus may establish communication with the optimizer, and then send an unlocking instruction to the optimizer. After the optimizer receives the unlocking instruction, the optimizer changes the original no-output state or limited-output state to an unlimited-output state. In this way, a limitation on the output of the optimizer may be removed.

SUMMARY

The embodiments provide a photovoltaic system, a method for adjusting a working state of an optimizer, and a controller. In the photovoltaic system, an unlocking apparatus may not be used. When a controller in the optimizer detects that an electrical signal parameter changes, the controller may adjust a working state of the optimizer from a no-output state or a limited-output state to an unlimited-output state. In this way, a limitation on an output power of the optimizer may be removed.

A first aspect provides a photovoltaic system. The photovoltaic system includes a photovoltaic panel and an optimizer. The optimizer includes a controller, a first output port, and a second output port. The first output port and the second output port may be directly connected to the controller or may be connected to the controller by using a sampling circuit. The controller is configured to detect an electrical signal parameter between the first output port and the second output port, where the electrical signal parameter is one of a current, a voltage, an output power, or an impedance. The controller is configured to adjust a working state of the optimizer from a no-output state or a limited-output state to an unlimited-output state when the electrical signal parameter between the first output port and the second output port changes. An output parameter of the optimizer in the no-output state is zero, an output parameter of the optimizer in the limited-output state is below a preset output parameter, and an output parameter of the optimizer in the unlimited-output state is not limited by the preset output parameter. The preset output parameter includes one or more of a voltage, a current, and a power. In the photovoltaic system, the working state of the optimizer can be adjusted without using an unlocking apparatus, to remove a limitation on an output of the optimizer, so that an implementation is simple, and costs are reduced.

Optionally, with reference to the first aspect, in a first possible implementation of the first aspect, that the controller is configured to adjust a working state of the optimizer from a no-output state or a limited-output state to an unlimited-output state when the electrical signal parameter between the first output port and the second output port changes includes: The controller is configured to adjust the working state of the optimizer from the no-output state or the limited-output state to the unlimited-output state when the controller detects that the electrical signal parameter between the first output port and the second output port changes to a value that falls within a preset parameter range. The preset parameter range is preset. The controller may adjust the working state of the optimizer from the no-output state or the limited-output state to the unlimited-output state when the electrical signal parameter between the first output port and the second output port changes to the value that falls within the preset parameter range. In this way, accuracy of the solution may be improved, and a case in which the electrical signal parameter changes but does not fall within the preset parameter range may be rule out.

Optionally, with reference to the first aspect, in a second possible implementation of the first aspect, that the controller is configured to adjust a working state of the optimizer from a no-output state or a limited-output state to an unlimited-output state when the electrical signal parameter changes includes: The controller is configured to adjust the working state of the optimizer from the no-output state or the limited-output state to the unlimited-output state when the controller detects that a continuous change of the electrical signal parameter between the first output port and the second output port complies with a preset rule. The preset rule is preset. The controller may adjust the working state of the optimizer from the no-output state or the limited-output state to the unlimited-output state when the continuous change of the electrical signal parameter between the first output port and the second output port complies with the preset rule. In this way, accuracy of the solution may be improved, and a case in which the electrical signal parameter changes but does not change according to the preset rule may be rule out.

Optionally, with reference to the first aspect to the second possible implementation of the first aspect, in a third possible implementation of the first aspect, that the controller is configured to adjust a working state of the optimizer from a no-output state or a limited-output state to an unlimited-output state when the controller detects that the electrical signal parameter between the first output port and the second output port changes includes: The controller is configured to adjust, after preset time, the working state of the optimizer from the no-output state or the limited-output state to the unlimited-output state when the controller detects that the electrical signal parameter between the first output port and the second output port changes. If the working state is directly changed after the first output port and the second output port are short-circuited, a large short-circuit current may occur. If the two output ports are directly disconnected, a case such as arcing or sparking may occur. The controller changes the working state after the preset time, so that the case such as arcing or sparking can be avoided.

Optionally, with reference to the third possible implementation of the first aspect, in a fourth possible implementation of the first aspect, the electrical signal parameter is an impedance value, the photovoltaic system further includes an electrical signal parameter conversion unit, the electrical signal parameter conversion unit includes a first port and a second port, the first port is configured to be connected to the first output port of the optimizer, and the second port is configured to be connected to the second output port of the optimizer. The electrical signal parameter conversion unit may change the electrical signal parameter between the first output port and the second output port of the optimizer, so that the controller in the optimizer can detect that the electrical signal parameter changes, and the controller subsequently adjusts the working state of the optimizer from the no-output state or the limited-output state to the unlimited-output state.

Optionally, with reference to the fourth possible implementation of the first aspect, in a fifth possible implementation of the first aspect, the electrical signal parameter conversion unit includes a first resistor. That the controller is configured to adjust the working state of the optimizer from the no-output state or the limited-output state to the unlimited-output state when the controller detects that the electrical signal parameter between the first output port and the second output port changes to a value that falls within a preset parameter range includes: The controller is configured to adjust the working state of the optimizer from the no-output state or the limited-output state to the unlimited-output state when the controller detects that an impedance value between the first output port and the second output port changes from an impedance value of an internal resistor of the optimizer to an impedance value obtained after the first resistor and the internal resistor of the optimizer are connected in parallel.

Optionally, with reference to the fourth possible implementation of the first aspect, in a sixth possible implementation of the first aspect, the electrical signal parameter conversion unit includes a second resistor and a first switch. The second resistor and the first switch are connected in series. When the first switch is open, an impedance value between the first output port and the second output port is an impedance value of an internal resistor of the optimizer; or when the first switch is closed, an impedance value between the first output port and the second output port is an impedance value obtained after an internal resistor of the optimizer and the second resistor are connected in parallel. That the controller is configured to adjust the working state of the optimizer from the no-output state or the limited-output state to the unlimited-output state when the controller detects that the electrical signal parameter between the first output port and the second output port changes to a value that falls within a preset parameter range includes: The controller is configured to adjust the working state of the optimizer from the no-output state or the limited-output state to the unlimited-output state when the controller detects that the impedance value between the first output port and the second output port changes from the impedance value of the internal resistor of the optimizer to the impedance value obtained after the first resistor and the internal resistor of the optimizer are connected in parallel.

Optionally, with reference to the fourth possible implementation of the first aspect, in a seventh possible implementation of the first aspect, the electrical signal parameter conversion unit includes a third resistor and a second switch. The third resistor and the second switch are connected in parallel. When the second switch is open, an impedance value between the first output port and the second output port is an impedance value obtained after an internal resistor of the optimizer and the third resistor are connected in parallel; or when the second switch is closed, an impedance between the first output port and the second output port is zero. That the controller is configured to adjust the working state of the optimizer from the no-output state or the limited-output state to the unlimited-output state when the controller detects that the electrical signal parameter between the first output port and the second output port changes to a value that falls within a preset parameter range includes: The controller is configured to adjust the working state of the optimizer from the no-output state or the limited-output state to the unlimited-output state when the controller detects that the impedance value between the first output port and the second output port changes, to zero, from the impedance value obtained after the third resistor and the internal resistor of the optimizer are connected in parallel.

A second aspect provides a method for adjusting a working state of an optimizer. The method is applied to a photovoltaic system. The photovoltaic system includes a photovoltaic panel and an optimizer. The optimizer includes a controller, a first output port, and a second output port. The method includes: The controller detects an electrical signal parameter between the first output port and the second output port, where the electrical signal parameter is one of a current, a voltage, an output power, or an impedance. The controller adjusts a working state of the optimizer from a no-output state or a limited-output state to an unlimited-output state when the electrical signal parameter between the first output port and the second output port changes. An output parameter of the optimizer in the no-output state is zero, an output parameter of the optimizer in the limited-output state is below a preset output parameter, and an output parameter of the optimizer in the unlimited-output state is not limited by the preset output parameter. The preset output parameter includes one or more of a voltage, a current, and a power. In the method for adjusting a working state of an optimizer, the photovoltaic system can adjust the working state of the optimizer without using an unlocking apparatus, so that an implementation is simple, and costs are reduced.

Optionally, with reference to the second aspect, in a first possible implementation of the second aspect, that the controller adjusts a working state of the optimizer from a no-output state or a limited-output state to an unlimited-output state when the electrical signal parameter between the first output port and the second output port changes includes: The controller adjusts the working state of the optimizer from the no-output state or the limited-output state to the unlimited-output state when the controller detects that a continuous change of the electrical signal parameter between the first output port and the second output port complies with a preset rule.

Optionally, with reference to the second aspect, in a second possible implementation of the second aspect, the electrical signal parameter is an impedance, and that the controller adjusts a working state of the optimizer from a no-output state or a limited-output state to an unlimited-output state when the electrical signal parameter between the first output port and the second output port changes includes: The controller adjusts the working state of the optimizer from the no-output state or the limited-output state to the unlimited-output state when the controller detects that the electrical signal parameter between the first output port and the second output port changes to a value that falls within a preset parameter range.

Optionally, with reference to any one of the second aspect to the second possible implementation of the second aspect, in a third possible implementation of the second aspect, that the controller adjusts a working state of the optimizer from a no-output state or a limited-output state to an unlimited-output state when the controller detects that the electrical signal parameter between the first output port and the second output port changes includes: The controller adjusts, after preset time, the working state of the optimizer from the no-output state or the limited-output state to the unlimited-output state when the controller detects that the electrical signal parameter between the first output port and the second output port changes. If the working state is directly changed after the first output port and the second output port are short-circuited, a large short-circuit current may occur. If the two output ports are directly disconnected, a case such as arcing or sparking may occur. The controller changes the working state after the preset time, so that the case such as arcing or sparking can be avoided.

A third aspect provides a controller. The controller is applied to a photovoltaic system. The photovoltaic system includes a photovoltaic panel and an optimizer. The optimizer includes a controller, a first output port, and a second output port. The controller is configured to detect an electrical signal parameter between the first output port and the second output port, where the electrical signal parameter is one of a current, a voltage, an output power, or an impedance. The controller is further configured to adjust a working state of the optimizer from a no-output state or a limited-output state to an unlimited-output state when the electrical signal parameter between the first output port and the second output port changes. An output parameter of the optimizer in the no-output state is zero, an output parameter of the optimizer in the limited-output state is below a preset output parameter, and an output parameter of the optimizer in the unlimited-output state is not limited by the preset output parameter. The preset output parameter includes one or more of a voltage, a current, and a power. The controller adjusts the working state of the optimizer without using an unlocking instruction of an external unlocking apparatus, so that an implementation is simple, and costs are reduced.

Optionally, with reference to the third aspect, in a first possible implementation of the third aspect, the controller is further configured to adjust the working state of the optimizer from the no-output state or the limited-output state to the unlimited-output state when the controller detects that the electrical signal parameter between the first output port and the second output port changes to a value that falls within a preset parameter range.

Optionally, with reference to the third aspect, in a second possible implementation of the third aspect, the controller is further configured to adjust the working state of the optimizer from the no-output state or the limited-output state to the unlimited-output state when the controller detects that a continuous change of the electrical signal parameter between the first output port and the second output port complies with a preset rule.

Optionally, with reference to any one of the third aspect, or the possible implementations of the third aspect, in a third possible implementation of the third aspect, the controller is further configured to adjust, after preset time, the working state of the optimizer from the no-output state or the limited-output state to the unlimited-output state when the controller detects that the electrical signal parameter between the first output port and the second output port changes. If the working state is directly changed after the first output port and the second output port are short-circuited, a large short-circuit current may occur. If the two output ports are directly disconnected, a case such as arcing or sparking may occur. The controller changes the working state after the preset time, so that the case such as arcing or sparking can be avoided.

A fourth aspect provides an optimizer. The optimizer includes a detection module, a first output port, and a second output port. The first output port and the second output port are separately connected to the detection module. The detection module is configured to detect an electrical signal parameter between the first output port and the second output port, where the electrical signal parameter is one of a current, a voltage, an output power, or an impedance. An adjustment module is configured to adjust a working state of the optimizer from a no-output state or a limited-output state to an unlimited-output state when the detection module detects that the electrical signal parameter between the first output port and the second output port changes. An output parameter of the optimizer in the no-output state is zero, an output parameter of the optimizer in the limited-output state is below a preset output parameter, and an output parameter of the optimizer in the unlimited-output state is not limited by the preset output parameter. The preset output parameter includes one or more of a voltage, a current, and a power. The working state of the optimizer can be adjusted without detecting an external unlocking instruction by the detection module, so that an implementation is simple, and costs are reduced.

Optionally, with reference to the fourth aspect, in a first possible implementation of the fourth aspect, the adjustment module is further configured to adjust the working state of the optimizer from the no-output state or the limited-output state to the unlimited-output state when the control module detects that a continuous change of the electrical signal parameter between the first output port and the second output port complies with a preset rule.

Optionally, with reference to the fourth aspect, in a second possible implementation of the fourth aspect, the adjustment module is further configured to adjust the working state of the optimizer from the no-output state or the limited-output state to the unlimited-output state when the control module detects that the electrical signal parameter between the first output port and the second output port changes to a value that falls within a preset parameter range.

Optionally, with reference to any one of the fourth aspect to the second possible implementation of the fourth aspect, in a third possible implementation of the fourth aspect, the adjustment module is further configured to adjust, after preset time, the working state of the optimizer from the no-output state or the limited-output state to the unlimited-output state when the control module detects that the electrical signal parameter between the first output port and the second output port changes. If the working state is directly changed after the first output port and the second output port are short-circuited, a large short-circuit current may occur. If the two output ports are directly disconnected, a case such as arcing or sparking may occur. The controller changes the working state after the preset time, so that the case such as arcing or sparking can be avoided.

The embodiments provide the photovoltaic system, the method for adjusting a working state of an optimizer, and the controller. The photovoltaic system includes the photovoltaic panel and the optimizer. The optimizer includes the controller, the first output port, and the second output port. The controller is configured to detect the electrical signal parameter between the first output port and the second output port. The controller is configured to adjust the working state of the optimizer from the no-output state or the limited-output state to the unlimited-output state when the electrical signal parameter changes. In the photovoltaic system, the unlocking apparatus may not be used. When the controller in the optimizer detects that the electrical signal parameter changes, the controller may adjust the working state of the optimizer from the no-output state or the limited-output state to the unlimited-output state. In this way, a limitation on an output power of the optimizer may be removed.

DETAILED DESCRIPTION OF THE EMBODIMENTS

The following describes the embodiments with reference to accompanying drawings. It is clear that, the described embodiments are merely a part rather than all of the embodiments. All other embodiments obtained by a person skilled in the art based on the embodiments without creative efforts shall fall within the scope of the embodiments.

In the embodiments and accompanying drawings, the terms "first", "second", and the like are intended to distinguish between similar objects but do not indicate a specific order or sequence. It should be understood that the data used in such a way are interchangeable in proper circumstances so that embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to those expressly listed steps or modules but may include other steps or modules not expressly listed or inherent to such a process, method, system, product, or device.

Figure 1:
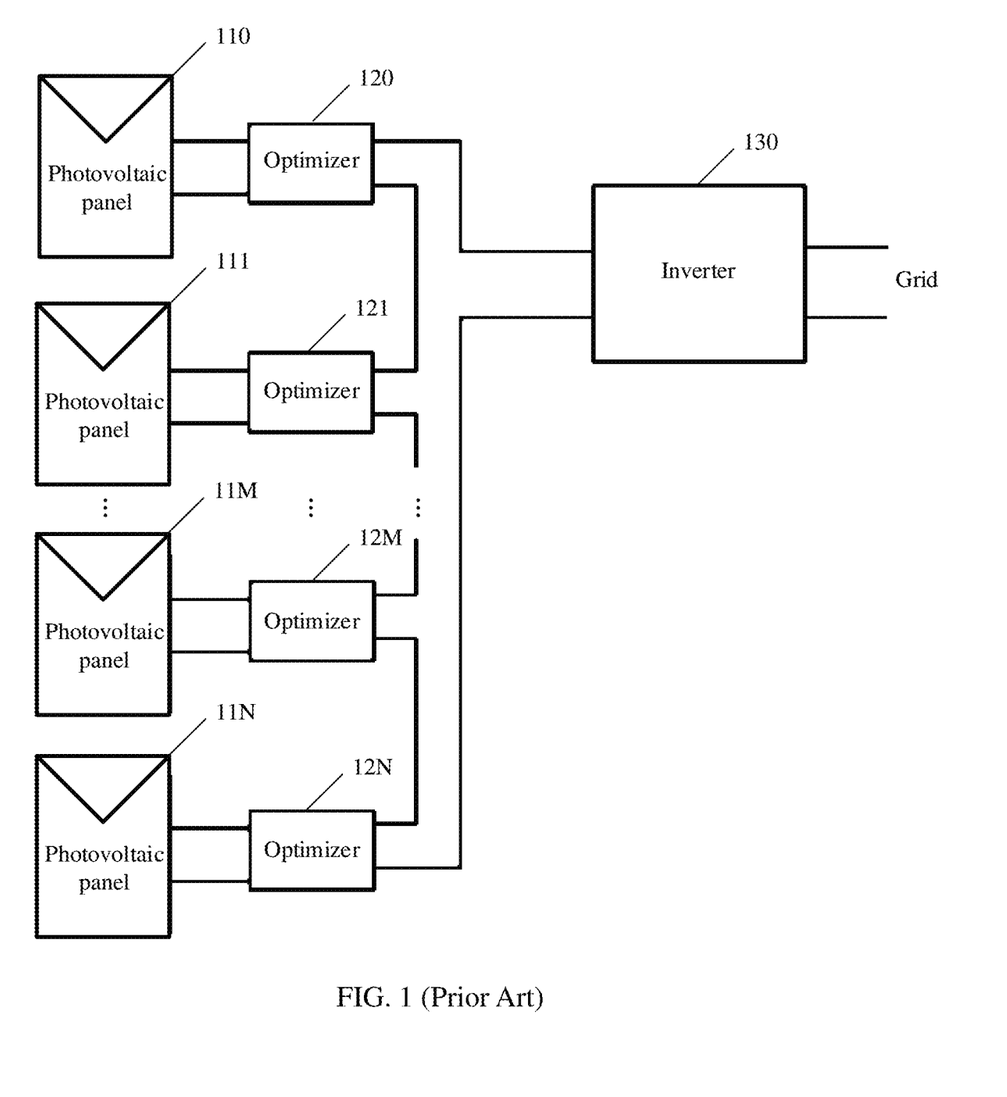
FIG. 1 is a schematic diagram of a photovoltaic power system architecture.

In the photovoltaic inverter field, maximum power tracking and fast shutdown may be implemented at a component level through cooperation between an optimizer and an inverter. As shown in FIG. 1, a typical photovoltaic power system generally includes a plurality of photovoltaic panels and a plurality of optimizers. Two output terminals of each photovoltaic panel are respectively connected to two input terminals of one optimizer, for example, two output terminals of a photovoltaic plate 110 are connected to two input terminals of an optimizer 120. After output terminals of all the optimizers are connected in series and then connected to two input terminals of an inverter 130, the inverter 130 converts direct current power into alternating current power. The optimizer 120 may track a maximum power of the photovoltaic panel, perform fast shutdown in a special case, monitor a running state of a photovoltaic module, and the like.

An input voltage of the inverter 130 is limited, and a sum of output voltages of the plurality of optimizers shown in FIG. 1 cannot exceed a maximum input voltage allowed by the inverter 130. Therefore, if the sum exceeds the maximum input voltage allowed by the inverter 130, the inverter 130 is damaged. In some scenarios, the inverter may communicate with the optimizer 120, and the inverter 130 may read an operating state and a parameter of the optimizer 120, including an input/output voltage, an input/output current, a power, a temperature, and the like. The inverter 130 may adjust the output voltage of the optimizer 120, to ensure that the sum of the output voltages of all the optimizers does not exceed the maximum input voltage allowed by the inverter 130.

However, in some other scenarios, the optimizer 120 cannot communicate with the inverter 130. In this case, the inverter 130 cannot control the output voltage of the optimizer 120. To ensure that an output voltage obtained after all the optimizers are connected in series does not exceed the maximum input voltage allowed by the inverter 130, a default working state of the optimizer 120 is a no-output state or a limited-output state. In this case, it may be ensured that the inverter 130 is not damaged. However, an output of the optimizer 120 is limited, and an output power of the entire photovoltaic system is limited. Therefore, when the optimizer 120 cannot communicate with the inverter 130, in a process of constructing the photovoltaic power system shown in FIG. 1, after the photovoltaic panel is connected to the optimizer 120, an unlocking apparatus needs to be used. The photovoltaic panel, the optimizer 120, and the unlocking apparatus may constitute a photovoltaic system.

Figure 2:
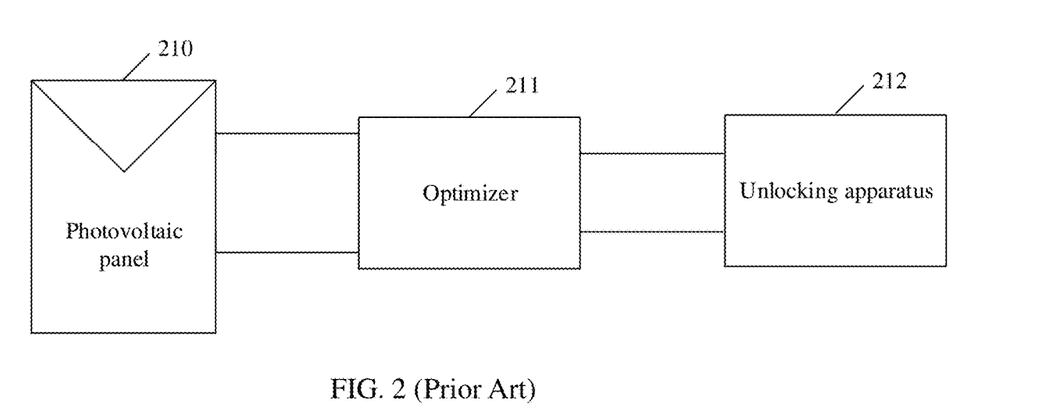
FIG. 2 is a schematic diagram of a photovoltaic system in a conventional technology.

As shown in FIG. 2, the photovoltaic system includes a photovoltaic panel 210, an optimizer 211, and an unlocking apparatus 212. An input of the optimizer 211 is connected to an output of the photovoltaic panel 210, and an input of the unlocking apparatus 212 is connected to an output of the optimizer 211. The unlocking apparatus 212 may establish communication with the optimizer 211, and then send an unlocking instruction to the optimizer 211. After the optimizer 211 receives the instruction, the optimizer 211 changes an original no-output state or limited-output state to an unlimited-output state. In this way, a limitation on an output power of the optimizer 211 may be removed. However, in such a photovoltaic system, the optimizer 211 needs to use, as a condition, the unlocking instruction sent by the unlocking apparatus 212. When receiving the unlocking instruction sent by the unlocking apparatus 212, the optimizer 211 changes the original working state such as the no-output state or the limited-output state to the unlimited-output state.

It should be noted that, after the working state of the optimizer 211 changes from the no-output state or the limited-output state to the unlimited-output state, in this solution, the output voltage obtained after all the optimizers are connected in series needs to be calculated based on an output voltage of each photovoltaic panel 210 and a quantity of photovoltaic panels, to ensure that after the photovoltaic power system shown in FIG. 1 is finally constructed, the output voltage obtained after all the optimizers are connected in series does not exceed the maximum input voltage allowed by the inverter.

In the photovoltaic system shown in FIG. 2, the optimizer 211 needs to depend on the unlocking apparatus 212, and use, as a condition for changing the working state, the unlocking instruction sent by the unlocking apparatus 212. In the process of constructing the photovoltaic power system shown in FIG. 1, the unlocking apparatus 212 needs to be connected to an optimizer 211. After the unlocking apparatus 212 sends an unlocking instruction to the optimizer 211, the optimizer 211 is disconnected from the unlocking apparatus 212. Then, the unlocking apparatus 212 is connected to another optimizer, and sends an unlocking instruction to the another optimizer. In this way, the unlocking apparatus 212 is transferred between optimizers. If the unlocking apparatus 212 is damaged or abnormal, it is difficult to obtain a new unlocking apparatus immediately. Consequently, a limitation is imposed on an implementation solution for constructing the photovoltaic power system.

Figure 3:
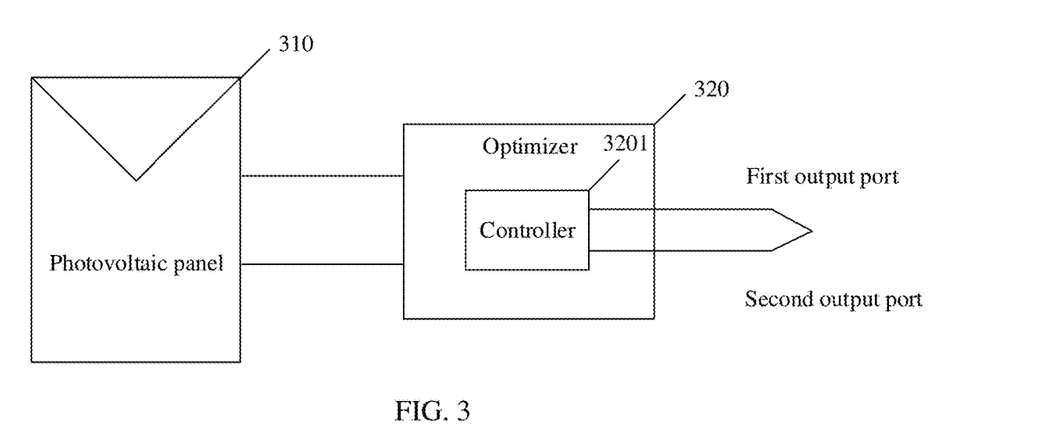
FIG. 3 is a schematic diagram of an embodiment of a photovoltaic system.

Therefore, Embodiment 1 provides a photovoltaic system. As shown in FIG. 3, the photovoltaic system includes a photovoltaic panel 310 and an optimizer 320. The optimizer 320 includes a controller 3201, a first output port, and a second output port. The first output port and the second output port may be separately connected to the controller 3201 or may be connected to the controller 3201 by using a sampling circuit. This is not limited herein. A direct connection is only used as an example in FIG. 3. The controller 3201 is configured to detect an electrical signal parameter between the first output port and the second output port. The electrical signal parameter may include one of a voltage, a current, or an impedance. From a process in which the first output port and the second output port are not short-circuited to a process in which the first output port and the second output port are short-circuited, the electrical signal parameter changes.

The controller 3201 is configured to adjust a working state of the optimizer 320 from a no-output state or a limited-output state to an unlimited-output state when the controller 3201 detects that the electrical signal parameter between the first output port and the second output port changes. An output parameter of the optimizer 320 in the no-output state is zero, an output parameter of the optimizer 320 in the limited-output state is below a preset output parameter, and an output parameter of the optimizer 320 in the unlimited-output state is not limited by the preset output parameter. The preset output parameter includes one or more of a voltage, a current, and a power.

When the controller 3201 detects that the electrical signal parameter between the first output port and the second output port changes, the controller 3201 may immediately change the working state of the optimizer 320 or may change the working state of the optimizer 320 after a preset time. If the working state is directly changed after the first output port and the second output port are short-circuited, a large short-circuit current may occur. If the two output ports are directly disconnected, a case such as arcing or sparking may occur. The controller 3201 changes the working state after the preset time, so that the case such as arcing or sparking can be avoided. For example, the preset time may be 5 minutes.

In an implementation, the controller 3201 adjusts the working state of the optimizer 320 from the no-output state or the limited-output state to the unlimited-output state when the controller 3201 detects that the electrical signal parameter between the first output port and the second output port changes to a value that falls within a preset parameter range. It should be noted that, in FIG. 3, when the first output port and the second output port are short-circuited, an impedance value between the first output port and the second output port approaches zero; or when the first output port and the second output port are not short-circuited, an impedance value between the first output port and the second output port is an impedance value of an internal resistor of the optimizer 320. In FIG. 3, an example in which the first output port and the second output port are short-circuited is used.

The impedance is affected by a temperature or another factor. After the first output port and the second output port are short-circuited, a conductor may also have a specified impedance value. Therefore, when the impedance between the first output port and the second output port falls within the preset parameter range, it may be considered that the first output port and the second output port are short-circuited. For example, the preset parameter range may be 0 ohms to 1 ohm, and the impedance value of the internal resistor of the optimizer 320 is greater than 1 ohm.

Therefore, after the first output port and the second output port are short-circuited, the controller 3201 may detect that the impedance value between the first output port and the second output port changes from the impedance value of the internal resistor of the optimizer 320 to the value that falls within the preset parameter range. The controller 3201 adjusts the working state of the optimizer 320 from the no-output state or the limited-output state to the unlimited-output state.

In another implementation, the controller 3201 is configured to adjust the working state of the optimizer 320 from the no-output state or the limited-output state to the unlimited-output state when the controller 3201 detects that a continuous change of the electrical signal parameter between the first output port and the second output port complies with a preset rule. For example, when the first output port and the second output port are short-circuited and then disconnected, and are short-circuited again and then disconnected again, the controller 3201 detects that an impedance value between the first output port and the second output port changes from an impedance value of an internal resistor of the optimizer 320 to a value that approaches zero, then changes to the impedance value of the internal resistor of the optimizer 320, then changes to the value that approaches zero, and finally changes to the impedance value of the internal resistor of the optimizer 320. The preset rule may be set as follows: The impedance value changes from the impedance value of the internal resistor of the optimizer 320 to the value that approaches zero, then changes to the impedance value of the internal resistor of the optimizer 320, then changes to the value that approaches zero, and finally changes to the impedance value of the internal resistor of the optimizer 320. The controller 3201 is configured to adjust the working state of the optimizer 320 from the no-output state or the limited-output state to the unlimited-output state when the continuous change of the impedance between the first output port and the second output port complies with the preset rule.

Figure 4:
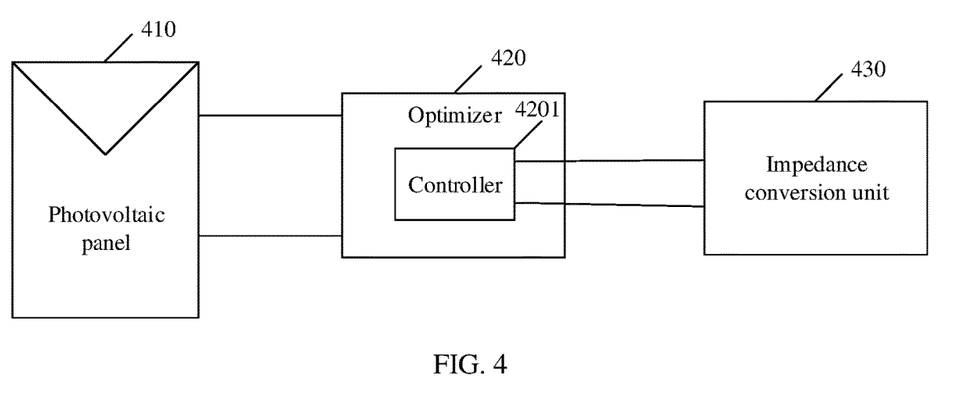
FIG. 4 is a schematic diagram of an embodiment of a photovoltaic system.

Optionally, the photovoltaic system may further include an electrical signal parameter conversion unit. Referring to FIG. 4, the photovoltaic system includes a photovoltaic panel 410, an optimizer 420, and an electrical signal parameter conversion unit 430. Two output terminals of the photovoltaic panel 410 are respectively connected to two input terminals of the optimizer 420. The optimizer 420 includes a first output port, a second output port, and a controller 4201. The controller 4201 is separately connected to the first output port and the second output port. Two ports of the electrical signal parameter conversion unit 430 are configured to be connected to the two output ports of the optimizer 420.

The following provides several examples of the electrical signal parameter conversion unit 430.

Figure 5:
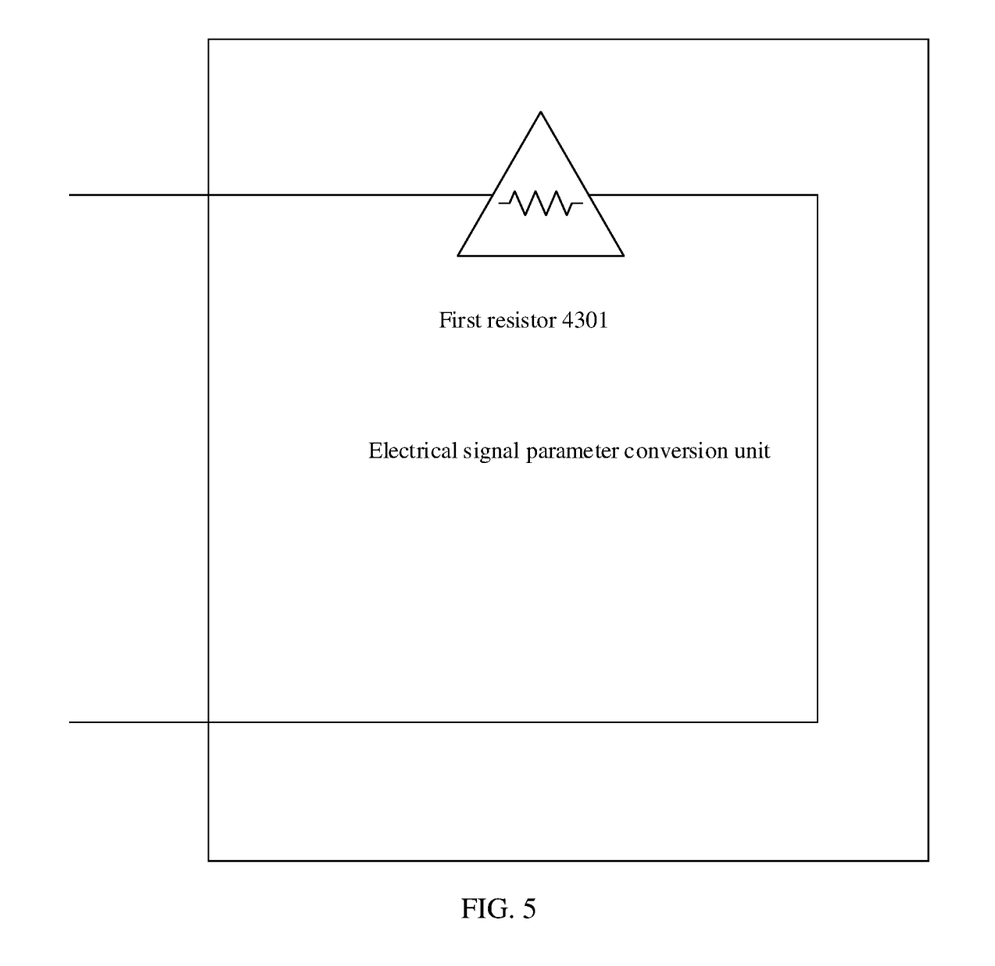
FIG. 5 is a schematic diagram of an embodiment of an electrical signal parameter conversion unit.

FIG. 5 provides an electrical signal parameter conversion unit. The electrical signal parameter conversion unit includes a first resistor 4301. When two ports of the electrical signal parameter conversion unit are respectively connected to the first output port and the second output port of the optimizer 420, the impedance value between the first output port and the second output port of the optimizer 420 is an impedance value obtained after the first resistor and the internal resistor of the optimizer 420 are connected in parallel. When two ports of the electrical signal parameter conversion unit are not connected to the first output port and the second output port of the optimizer 420, the impedance value between the first output port and the second output port of the optimizer 420 is the impedance value of the internal resistor of the optimizer 420.

For example, the controller 4201 may adjust the working state of the optimizer 420 from the no-output state or the limited-output state to the unlimited-output state when the controller 4201 detects that the electrical signal parameter between the first output port and the second output port changes to a value that falls within a preset parameter range. The controller 4201 may adjust the working state of the optimizer 420 from the no-output state or the limited-output state to the unlimited-output state when the controller 4201 detects that the impedance value between the first output port and the second output port changes from the impedance value of the internal resistor of the optimizer 420 to the impedance value obtained after the first resistor 4301 and the internal resistor of the optimizer 420 are connected in parallel.

Alternatively, the controller 4201 may adjust the working state of the optimizer 420 from the no-output state or the limited-output state to the unlimited-output state when the controller 4201 detects that the electrical signal parameter between the first output port and the second output port changes to a value that falls within a preset parameter range. The controller 4201 may adjust the working state of the optimizer 420 from the no-output state or the limited-output state to the unlimited-output state when the controller 4201 detects that the impedance value between the first output port and the second output port changes, to the impedance value of the internal resistor of the optimizer 420, from the impedance value obtained after the first resistor 4301 and the internal resistor of the optimizer 420 are connected in parallel.

The controller 4201 may further adjust the working state of the optimizer 420 from the no-output state or the limited-output state to the unlimited-output state when the controller 4201 detects that the continuous change of the electrical signal parameter between the first output port and the second output port complies with the preset rule. For example, when the controller 4201 detects that the impedance value between the first output port and the second output port changes from the impedance value of the internal resistor of the optimizer 420 to the impedance value obtained after the internal resistor of the optimizer 420 and the first resistor 4301 are connected in parallel, and then changes to the impedance value of the internal resistor of the optimizer 420, the controller 4201 adjusts the working state of the optimizer 420 from the no-output state or the limited-output state to the unlimited-output state.

Figure 6:
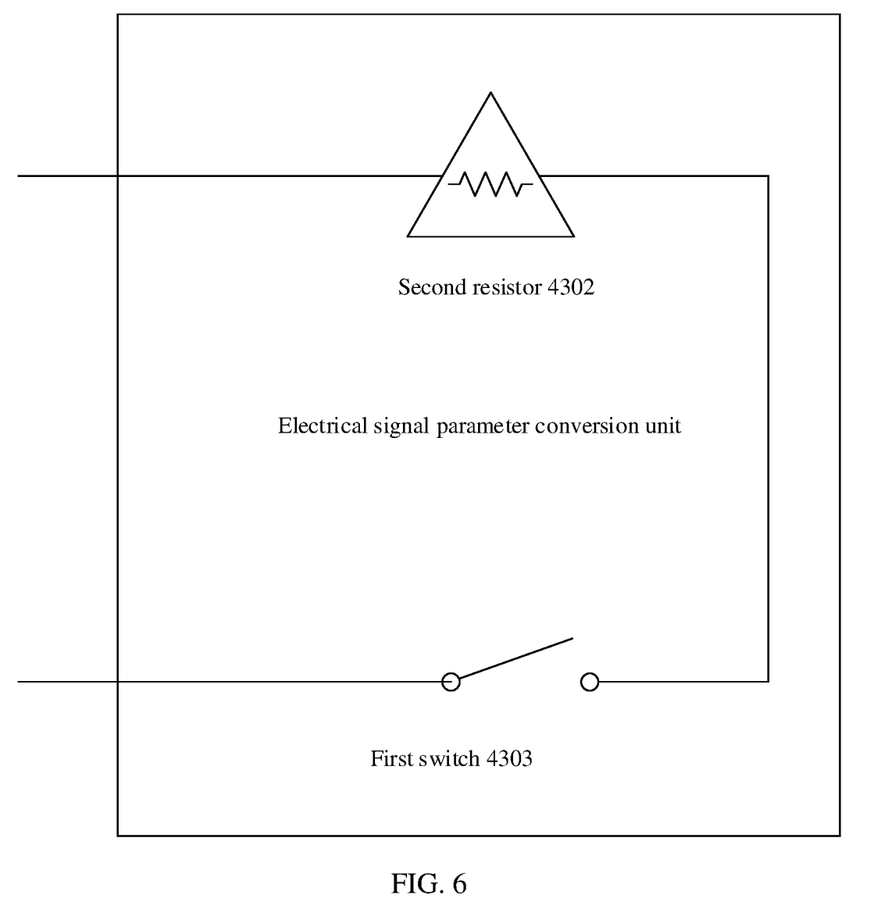
FIG. 6 is a schematic diagram of an embodiment of an electrical signal parameter conversion unit.

FIG. 6 provides an electrical signal parameter conversion unit. The electrical signal parameter conversion unit includes a second resistor 4302 and a first switch 4303, and the second resistor 4302 and the first switch 4303 are connected in series. Two ports of the electrical signal parameter conversion unit are respectively connected to the first output port and the second output port of the optimizer 420. When the first switch 4303 is closed, the impedance value between the first output port and the second output port of the optimizer 420 is an impedance value obtained after the second resistor 4302 and the internal resistor of the optimizer 420 are connected in parallel. When the first switch 4303 is open, the impedance value between the first output port and the second output port of the optimizer 420 is the impedance value of the internal resistor of the optimizer 420.

For example, the controller 4201 may detect that the electrical signal parameter between the first output port and the second output port changes. The controller 4201 may detect that the impedance value between the first output port and the second output port changes from the impedance value of the internal resistor of the optimizer 420 to the impedance value obtained after the internal resistor of the optimizer 420 and the second resistor 4302 are connected in parallel. Alternatively, the controller 4201 may detect that the impedance value between the first output port and the second output port changes, to the impedance value of the internal resistor of the optimizer 420, from the impedance value obtained after the internal resistor of the optimizer 420 and the second resistor 4302 are connected in parallel. Alternatively, the controller 4201 may detect that the impedance between the first output port and the second output port continuously changes according to a preset rule. For example, the preset rule may be as follows: The impedance value changes from the impedance value of the internal resistor of the optimizer 420 to the impedance value obtained after the internal resistor of the optimizer 420 and the second resistor 4302 are connected In parallel, and then changes to the impedance value of the internal resistor of the optimizer 420. The controller 4201 may adjust the working state of the optimizer 420 from the no-output state or the limited-output state to the unlimited-output state when the controller 4201 in the optimizer 420 detects that the electrical signal parameter between the first output port and the second output port changes.

Figure 7:
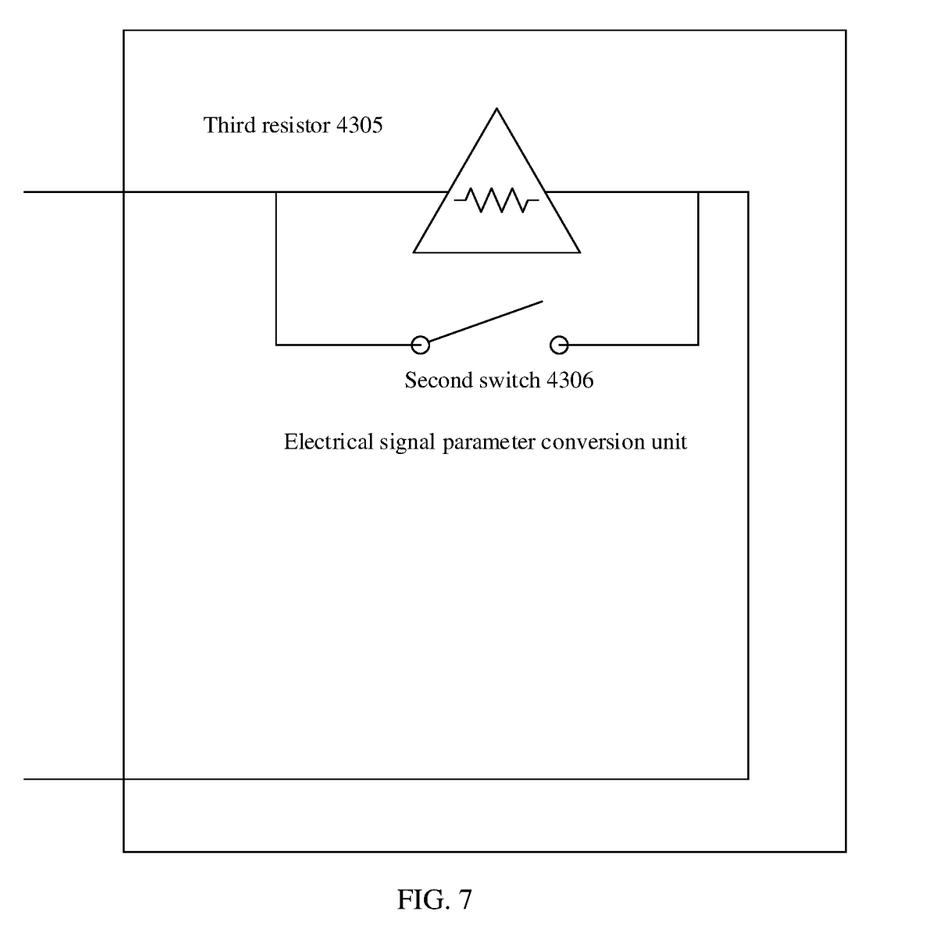
FIG. 7 is a schematic diagram of an embodiment of an electrical signal parameter conversion unit.

FIG. 7 provides an electrical signal parameter conversion unit. The electrical signal parameter conversion unit includes a third resistor 4305 and a second switch 4306, and the third resistor 4305 and the second switch 4306 are connected in parallel. Two ports of the electrical signal parameter conversion unit are respectively connected to the first output port and the second output port of the optimizer 420. When the second switch is open, the impedance value between the first output port and the second output port of the optimizer 420 is an impedance value obtained after the internal resistor of the optimizer 420 and the third resistor are connected in parallel. When the second switch is closed, the impedance value between the first output port and the second output port approaches zero.

For example, the controller 4201 may detect that the electrical signal parameter between the first output port and the second output port changes. The controller 4201 may detect that the impedance value between the first output port and the second output port changes, to zero, from the impedance value obtained after the internal resistor of the optimizer 420 and the third resistor 4305 are connected in parallel. Alternatively, the controller 4201 may detect that the impedance between the first output port and the second output port changes from zero to the impedance value obtained after the internal resistor of the optimizer 420 and the third resistor 4305 are connected in parallel. Alternatively, the controller 4201 may detect that the impedance between the first output port and the second output port continuously changes according to a preset rule. For example, the preset rule may be as follows: The impedance between the first output port and the second output port changes, to zero, from the impedance value obtained after the internal resistor of the optimizer 420 and the third resistor 4305 are connected in parallel, and then changes to the impedance value obtained after the internal resistor of the optimizer 420 and the third resistor 4305 are connected in parallel. The controller 4201 may adjust the working state of the optimizer 420 from the no-output state or the limited-output state to the unlimited-output state when the controller 4201 detects that the electrical signal parameter between the first output port and the second output port changes.

In the photovoltaic system provided in Embodiment 1, the controller 4201 may adjust the working state of the optimizer 420 from the no-output state or the limited-output state to the unlimited-output state when the controller 4201 in the optimizer 420 detects that the electrical signal parameter between the first output port and the second output port of the optimizer 420 changes. In the photovoltaic system, the working state can be adjusted without using an external unlocking apparatus. Compared with a photovoltaic system in a conventional technology, the photovoltaic system has advantages of simpleness, a low cost, and good availability.

Figure 8:
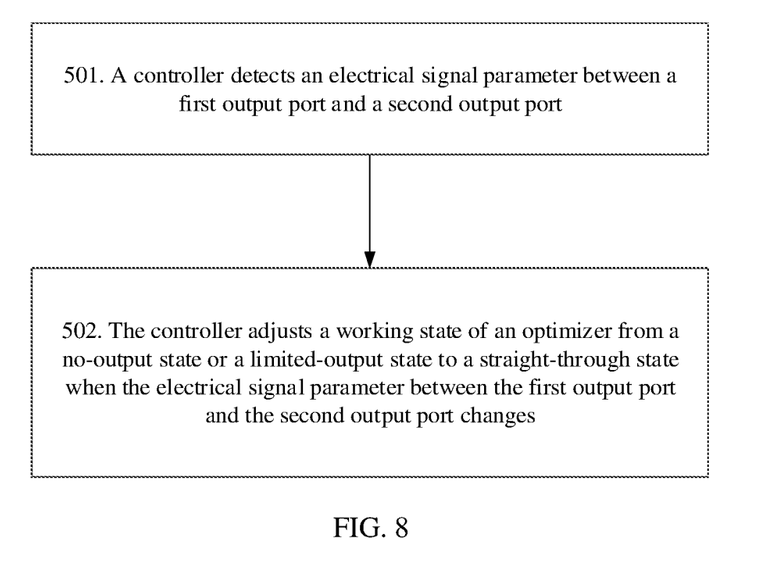
FIG. 8 is a schematic diagram of an embodiment of a method for adjusting a working state of an optimizer.

Embodiment 2 provides a method for adjusting a working state of an optimizer. The method is applied to the photovoltaic system provided in Embodiment 1. Referring to FIG. 8, the method includes the following steps:

501. A controller detects an electrical signal parameter between a first output port and a second output port.

The controller detects the electrical signal parameter between the first output port and the second output port. The controller is located in an optimizer, and the controller is separately connected to the first output port and the second output port of the optimizer. The electrical signal parameter is one of a voltage, a current, an output power, or an impedance.

502. The controller adjusts a working state of the optimizer from a no-output state or a limited-output state to an unlimited-output state when the electrical signal parameter between the first output port and the second output port changes.

The controller adjusts the working state of the optimizer from the no-output state or the limited-output state to the unlimited-output state when the controller detects that the electrical signal parameter between the first output port and the second output port changes.

That the controller adjusts the working state of the optimizer from the no-output state or the limited-output state to the unlimited-output state when the controller detects that the electrical signal parameter between the first output port and the second output port changes may include:

The controller adjusts the working state of the optimizer from the no-output state or the limited-output state to the unlimited-output state when the controller detects that the electrical signal parameter between the first output port and the second output port changes to a value that falls within a preset parameter range or when the controller detects that a continuous change of the electrical signal parameter between the first output port and the second output port complies with a preset rule. An output parameter of the optimizer in the no-output state is zero, an output parameter of the optimizer in the limited-output state is below a preset output parameter, and an output parameter of the optimizer in the unlimited-output state is not limited by the preset output parameter. The preset output parameter includes one or more of a voltage, a current, and a power. For details, refer to the related descriptions in Embodiment 1. Details are not described herein again.

When the controller detects that the electrical signal parameter between the first output port and the second output port changes, the controller may immediately change the working state of the optimizer or may change the working state of the optimizer after preset time. If the working state is directly changed after the first output port and the second output port are short-circuited, a large short-circuit current may occur. If the two output ports are directly disconnected, a case such as arcing or sparking may occur. The controller changes the working state after the preset time, so that the case such as arcing or sparking can be avoided.

In the method for adjusting a working state of an optimizer, the working state of the optimizer can be adjusted without using an unlocking apparatus. Compared with a photovoltaic system in a conventional technology, the photovoltaic system has advantages of simpleness, a low cost, and good availability.

Figure 9:
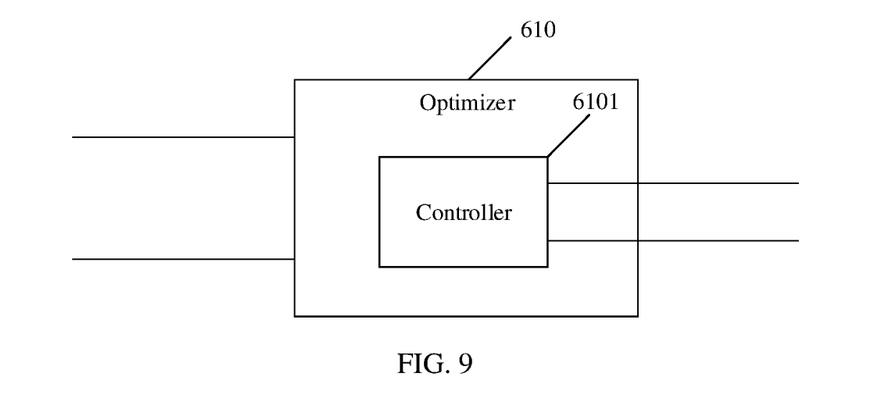
FIG. 9 is a schematic diagram of an embodiment of an optimizer.

As shown in FIG. 9, Embodiment 3 provides an optimizer 610. The optimizer 610 is located in the photovoltaic system described in Embodiment 1, the optimizer 610 includes a controller 6101 and two output ports, and the controller 6101 is separately connected to the two output ports.

The controller 6101 is configured to detect an electrical signal parameter between a first output port and a second output port.

The controller 6101 is further configured to adjust a working state of the optimizer 610 from a no-output state or a limited-output state to an unlimited-output state when the electrical signal parameter between the first output port and the second output port changes.

The controller 6101 is further configured to adjust the working state of the optimizer 610 from the no-output state or the limited-output state to the unlimited-output state when the controller 6101 detects that the electrical signal parameter between the first output port and the second output port changes to a value that falls within a preset parameter range.

The controller 6101 is further configured to adjust the working state of the optimizer 610 from the no-output state or the limited-output state to the unlimited-output state when the controller 6101 detects that a continuous change of the electrical signal parameter between the first output port and the second output port complies with a preset rule.

Figure 10:
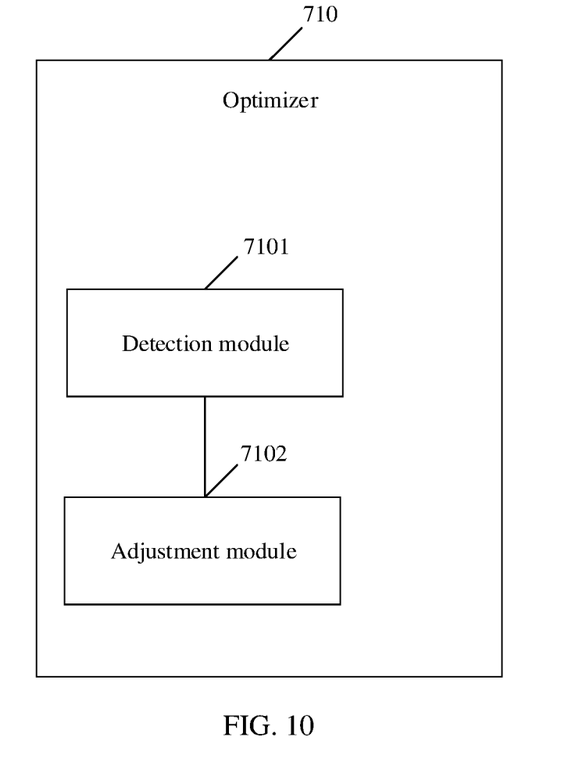
FIG. 10 is a schematic diagram of an embodiment of an optimizer.

As shown in FIG. 10, Embodiment 4 provides an optimizer 710. The optimizer 710 includes a detection module 7101 and an adjustment module 7102.

The detection module 7101 is configured to detect an electrical signal parameter between a first output port and a second output port of the optimizer 710.

The adjustment module 7102 is configured to adjust a working state of the optimizer 710 from a no-output state or a limited-output state to an unlimited-output state when the detection module 7101 detects that the electrical signal parameter between the first output port and the second output port changes.

The adjustment module 7102 is further configured to adjust the working state of the optimizer 710 from the no-output state or the limited-output state to the unlimited-output state when a continuous change of the electrical signal parameter between the first output port and the second output port complies with a preset rule. Detection of the continuous change can be made, for example, by a control module.

The adjustment module 7102 is further configured to adjust the working state of the optimizer 710 from the no-output state or the limited-output state to the unlimited-output state when the electrical signal parameter between the first output port and the second output port changes to a value that falls within a preset parameter range. Detection of this change can be made, for example, by a control module.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the embodiments, it should be understood that the system, apparatus, and method may be implemented in another manner. For example, the described apparatus embodiment is merely an example For example, the module division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The network controller, system, and resource allocation method provided in the embodiments are described in detail above. The principles and implementations are described herein by using examples. The description about the embodiments is merely used to help understand the method. In addition, persons of ordinary skill in the art can make modifications in terms of the implementations. Therefore, the content of the embodiments shall not be construed as a limiting. Although the embodiments are described in detail, persons of ordinary skill in the art should understand that they may still make modifications to the foregoing embodiments or make equivalent replacements to some features thereof, without departing from the scope of the embodiments.

What is claimed is:

1. A photovoltaic system, wherein the photovoltaic system comprises an optimizer, and the optimizer comprises:
   a controller,
   a first output port,
   a second output port, and
   an electrical signal parameter conversion unit that further comprises a first port configured to be connected to the first output port of the optimizer, a second port configured to be connected to the second output port of the optimizer, and a first resistor; and
   the controller is further configured to adjust the working state of the optimizer from the no-output state or the limited-output state to the unlimited-output state when the controller detects that an impedance value between the first output port and the second output port changes from an impedance value of an internal resistor of the optimizer to an impedance value obtained after the first resistor and the internal resistor of the optimizer are connected in parallel.

2. A photovoltaic system, wherein the photovoltaic system comprises an optimizer, and the optimizer comprises:
   a controller,
   a first output port,
   a second output port, and
   an electrical signal parameter conversion unit that further comprises a first port configured to be connected to the first output port of the optimizer, a second port configured to be connected to the second output port of the optimizer, a second resistor and a first switch, wherein the second resistor and the first switch are connected in series; and when the first switch is open, an impedance value between the first output port and the second output port is an impedance value of an internal resistor of the optimizer; or when the first switch is closed, an impedance value between the first output port and the second output port is an impedance value obtained after the internal resistor of the optimizer and the second resistor are connected in parallel; and
   the controller is further configured to adjust the working state of the optimizer from the no-output state or the limited-output state to the unlimited-output state when the controller detects that the impedance value between the first output port and the second output port changes from the impedance value of the internal resistor of the optimizer to the impedance value obtained after the second resistor and the internal resistor of the optimizer are connected in parallel.

3. A photovoltaic system, wherein the photovoltaic system comprises an optimizer, and the optimizer comprises:
   a controller,
   a first output port,
   a second output port, and
   an electrical signal parameter conversion unit that further comprises a first port configured to be connected to the first output port of the optimizer, a second port configured to be connected to the second output port of the optimizer, a third resistor and a second switch, wherein the third resistor and the second switch are connected in parallel; and when the second switch is open, an impedance value between the first output port and the second output port is an impedance value obtained after an internal resistor of the optimizer and the third resistor are connected in parallel; or when the second switch is closed, an impedance between the first output port and the second output port is zero; and the controller is further configured to adjust the working state of the optimizer from the no-output state or the limited-output state to the unlimited-output state when the controller detects that the impedance value between the first output port and the second output port changes, to zero, from the impedance value obtained after the third resistor and the internal resistor of the optimizer are connected in parallel.

\* \* \* \* \*